United States Patent [19]

Cuffe et al.

[11] Patent Number: 5,634,373

[45] Date of Patent: Jun. 3, 1997

[54] ROTATIONAL TO LINEAR MOVEMENT ACTUATOR WITH LIMITER

[75] Inventors: Albert A. Cuffe, Richmond; Werner E. Jordi, North Vancouver, both of Canada

[73] Assignee: Measurex Devron Inc., North Vancouver, Canada

[21] Appl. No.: 506,079

[22] Filed: Jul. 24, 1995

[51] Int. Cl.$^6$ ................................................. F16H 27/02
[52] U.S. Cl. ............................................ 74/89.15; 74/640
[58] Field of Search ................................ 74/89.15, 640

[56] References Cited

U.S. PATENT DOCUMENTS

| | | | |
|---|---|---|---|
| 4,716,785 | 1/1988 | Godai et al. | 74/640 |
| 4,833,941 | 5/1989 | Leppanen et al. | 74/625 |
| 4,909,099 | 3/1990 | Ulbing | 74/640 |
| 4,951,518 | 8/1990 | Hendershot | 74/640 |
| 5,370,011 | 12/1994 | Gilges et al. | 74/640 |

Primary Examiner—Andrea L. Pitts
Assistant Examiner—David M. Fenstermacher
Attorney, Agent, or Firm—Christie, Parker & Hale, LLP

[57] ABSTRACT

An actuator converts rotational movement to linear movement and at the same time transmits a limited linear force without requiring slip clutches or the like. The actuator has an electric motor in a fixed housing with a drive shaft on a longitudinal axis. A drive gear, substantially free of backlash, is connected to the drive shaft and has an output connection to drive a drive nut with an internal screw thread on the rotary axis. An output shaft has an external screw thread engaging with the internal screw thread of the drive nut and moves linearly when the drive nut is rotated. A voltage control system allows the voltage to the motor to be set so that for a set voltage there is a predetermined longitudinal force on the output shaft.

13 Claims, 1 Drawing Sheet

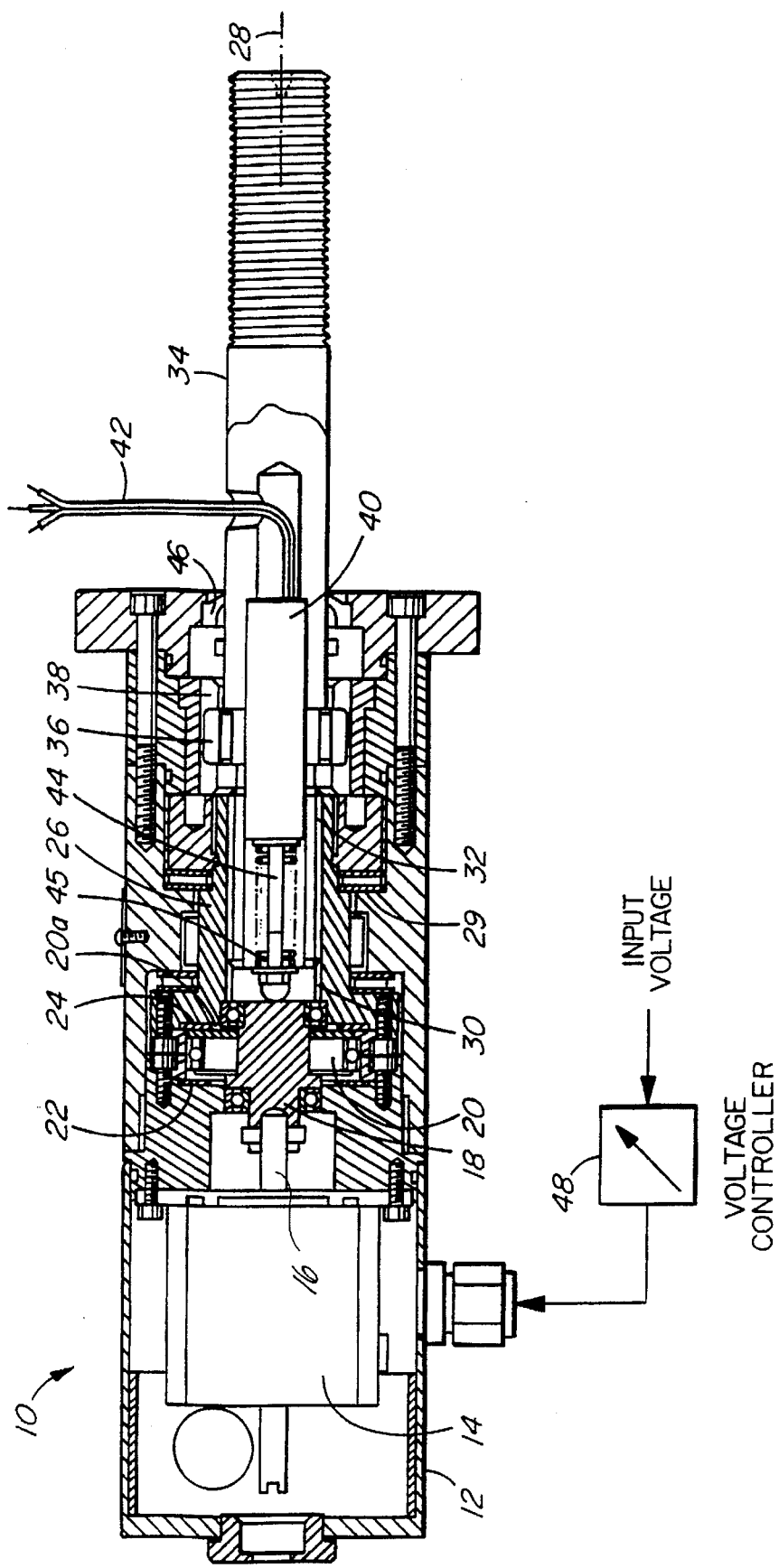

ROTATIONAL TO LINEAR MOVEMENT ACTUATOR WITH LIMITER

BACKGROUND

The present invention relates to an actuator for converting rotational movement to linear movement and more specifically to an actuator that transmits a predetermined limited linear force.

Compact backlash free systems for converting a rotational movement to an accurate linear movement are known. Such devices are used, for example, for controlling the size of an opening through which material is metered. In a paper machine, for example, there is a requirement to vary the size of the individual transverse openings across the face of the machine for feeding fibre suspension from the slice of the machine. A short section of the slice lip is moved precisely by a motor driven actuator and this movement or deflection of the slice lip requires a specific force. Too great a force causes too great a deflection and insufficient force does not provide sufficient movement.

One example of a slice lip automation device is shown in our U.S. Pat. No. 4,833,941. This patent illustrates two stages of harmonic drive wave generators in the drawings, although if sufficient reduction can be achieved in a single stage harmonic drive gear, the actuator performs satisfactorily. The disclosure of this patent is incorporated herein by reference.

A slice lip actuator is a compact unit and converts a relatively high speed rotational movement of relatively low torque into an accurate linear movement to provide a relatively high output force. A high speed low torque motor drives a backlash free gear reducer which in turn rotates a drive nut. The drive nut drives an output shaft, which is restricted from rotating, to move the shaft linearly.

SUMMARY OF THE INVENTION

The present invention provides an actuator for converting a rotational movement to a linear movement for transmitting a predetermined longitudinal force. By controlling the voltage to an electric motor driving the unit, the longitudinal output force can be controlled. This system avoids the necessity of having clutches to prevent excessive output force. The present invention provides a more simplified design than previous slice lip actuators, with fewer parts as no clutch is required. In another embodiment, an internal linear potentiometer monitors displacement of the output shaft, thus both longitudinal force and longitudinal movement can be controlled.

The present invention provides an actuator for converting a rotational movement to a linear movement for transmitting a predetermined longitudinal force, comprising a rotary electric motor within a fixed housing, the motor having a longitudinal axis with a rotating drive shaft extending thereon, a drive gear means, substantially free of backlash, the drive gear means having an intermediate shaft on the longitudinal axis connected to the rotating drive shaft, and an output connection about the longitudinal axis, the output connection rotating at a lower speed than the rotating drive shaft, a drive nut with internal screw thread rotatable in the fixed housing about the longitudinal axis, and joined to the output connection of the drive gear means, the drive nut rotatable but not movable longitudinally in the fixed housing, an output shaft with external screw thread engaging with the internal screw thread of the drive nut, the output shaft having means to prevent rotation within the housing and adapted to move linearly on the longitudinal axis when the drive nut is rotated, and voltage control means to set a voltage for the motor to provide the predetermined longitudinal force on the output shaft.

The present invention also provides a method of applying a predetermined longitudinal force utilizing a rotary electric motor comprising the steps of rotating an electric motor on a longitudinal axis to rotate a drive nut through a drive gear means within a fixed housing, the drive nut rotating at a slower rotational speed than the electric motor, the drive nut rotatable but not movable longitudinally in the fixed housing on the longitudinal axis, an internal screw thread on the drive nut engaging with an external screw thread on an output shaft such that rotation of the drive nut moves the output shaft linearly on the longitudinal axis, and controlling voltage to the electric motor so that a set voltage provides the predetermined longitudinal force on the output shaft.

BRIEF DESCRIPTION OF THE DRAWING

The drawing which illustrates a sectional view showing an actuator for converting rotational movement to a linear movement according to one embodiment of the present invention.

DETAILED DESCRIPTION

The actuator 10 as shown in the drawing has a housing 12 which has at one end a rotary electric motor 14 attached by motor shaft 16 to an intermediate shaft 18 which forms part of a harmonic pancake drive gear 20. The drive gear 20 has a static side 22 which engages the housing 12 so that it cannot rotate or slide. An output connection 24 on the outside face 20a of the drive gear 20 rotates and is joined to a drive nut 26. The motor 14, drive gear 20 and drive nut 26 are all on a rotational longitudinal axis 28. The drive gear 20 reduces the rotational speed so that the drive nut 26 is rotated at a considerably lower speed than the motor shaft 16. While the drive nut 26 can rotate, it is held to the drive gear 20 by the output connection 24 and therefore cannot move linearly in the housing 12. There is also a thrust bearing arrangement 29 to prevent linear movement.

An internal thread 30 is provided in the drive nut 26 which engages an external thread 32 of an output shaft 34. The output shaft 34 has a spline shoulder 36 wherein splines engage in a series of internal grooves 38 in the housing 12. Thus, when the drive nut 26 rotates, the internal screw threads 30 engage the external screw threads 32 of the output shaft 34 and because the output shaft 34 cannot rotate, it moves linearly on the longitudinal axis 28. An external portion of the output shaft 34 extends out beyond the housing 12 and can have a screw thread or other type of connection thereon to be connected to, for example, a slice lip of a paper machine or other device that requires linear movement.

The output shaft 34 is hollow and has a linear potentiometer 40 fixed therein with a wiring connection 42 leading out of an aperture in the output shaft 34 to a monitoring device to measure displacement. A sensor shaft 44 is positioned on the longitudinal axis 28 extending into the potentiometer 40 in the drive shaft from an end face of the intermediate shaft 18. A return spring 45 keeps the sensor shaft 44 pushed up to the end face of the intermediate shaft 18. Thus, as the drive nut 38 rotates and moves the output shaft 34 outward from the housing 12, the sensor shaft 44 is stationary, kept in position by the return spring 45, and the displacement of the sensor shaft 44 in the potentiometer 40 is monitored, providing a measurement of linear movement of the output shaft 34.

The electric motor 14 has a defined hysteresis so that by varying the voltage to the motor by voltage controller 48, the maximum output torque from the motor is determined. The relationship between motor voltage and longitudinal force of the output shaft 34 is determined based upon gear ratio and type of motor. By controlling the voltage, i.e., by setting a particular voltage, a predetermined longitudinal force is exerted by the output shaft 34. The force cannot be higher than this predetermined value as the motor simply stalls and cuts off if the load exceeds the predetermined value.

With a predetermined force applied to the output shaft 34, the linear movement of the output shaft 34 can be monitored by the potentiometer 40. Thus, an operator is aware as to the exact distance moved by the output shaft 34. If for example this distance is not the required distance but the motor 14 has cut out, then the operator knows that there may be another reason such as a blockage that prevents the desired movement.

In one embodiment the outside diameter of the housing 12 is 60 mm and the electric motor 14 produces a force of 1,000 lbs. at 16 volts. In another embodiment the motor 14 produces 1,500 lbs. at 24 volts. No clutch is needed as setting the voltage to the motor 14 automatically limits the force available from the output shaft 34.

In another embodiment a variable voltage control is provided which is adjustable for different voltages representing different longitudinal forces on the output shaft 34.

As shown in the drawing, seal 46 is positioned at the end of the housing 12 sealing the housing 12 to the output shaft 34.

Various changes may be made to the device for converting rotational movement to linear movement of the present invention without departing from the scope of the present invention which is limited only by the following claims.

What is claimed is:

1. An actuator for converting a rotational movement to a linear movement for transmitting a predetermined longitudinal force comprising:

a rotary electric motor within a fixed housing, the motor having a longitudinal axis with a rotating drive shaft extending thereon;

a drive gear reducer, substantially free of backlash, the drive gear reducer having an intermediate shaft on the longitudinal axis connected to the rotating drive shaft, and an output connection about the longitudinal axis, the output connection rotating at a lower speed than the rotating drive shaft;

a drive nut having an internal screw thread capable of rotating in the fixed housing about the longitudinal axis, and joined to the output connection of the drive gear the drive nut rotatable but not movable longitudinally in the fixed housing;

an output shaft having an external screw thread capable of engaging with the internal screw thread of the drive nut, the output shaft having means to prevent rotation within the housing and adapted to move linearly on the longitudinal axis when the drive nut is rotated;

voltage controller to set a voltage for the motor to provide the predetermined longitudinal force on the output shaft; and a linear potentiometer joined to the output shaft with a spring loaded sensor shaft extending from the linear potentiometer to measure linear movement between the fixed housing and the output shaft.

2. The actuator for converting a rotational movement to a linear movement according to claim 1 wherein the drive gear reducer is a harmonic pancake drive gear.

3. The actuator for converting a rotational movement to a linear movement according to claim 2 wherein the drive gear comprises a face, and the output connection of the drive gear is the face of the drive gear and the output connection is joined to the drive nut.

4. The actuator for converting a rotational movement to a linear movement according to claim 1 wherein the output shaft is splined and slides in longitudinal grooves in the fixed housing to prevent rotation.

5. The actuator for converting a rotational movement to a linear movement according to claim 1 wherein the electric motor is controlled to a maximum of 24 volts and provides a longitudinal force of about 1,500 lbs.

6. The actuator for converting a rotational movement to a linear movement according to claim 1 wherein the linear potentiometer is located within the output shaft and attached to the output shaft.

7. The actuator for converting a rotational movement to a linear movement according to claim 6 wherein the spring loaded shaft extends between the linear potentiometer and the intermediate shaft of the drive gear reducer.

8. The actuator for converting a rotational movement to a linear movement according to claim 1 wherein the outside diameter of the fixed housing is approximately 60 mm.

9. The actuator for converting a rotational movement to a linear movement according to claim 1 wherein the electric motor is controlled to a maximum of 16 volts and provides a longitudinal force of about 1,000 lbs.

10. A method of applying a predetermined longitudinal force utilizing a rotary electric motor comprising the steps of:

rotating an electric motor on a longitudinal axis to rotate a drive nut through a drive gear reducer within a fixed housing, the drive nut rotating at a slower rotational speed than the electric motor, the drive nut rotatable but not movable longitudinally in the fixed housing on the longitudinal axis, an internal screw thread on the drive nut engaging with an external screw thread on an output shaft such that rotation of the drive nut moves the output shaft linearly on the longitudinal axis;

controlling voltage to the electric motor so that a set voltage provides the predetermined longitudinal force on the output shaft; and measuring linear movement between the fixed housing and the output shaft using a linear potentiometer joined to the output shaft with a spring loaded sensor shaft extending from the linear potentiometer.

11. The method of applying a predetermined longitudinal force according to claim 10 including measuring linear movement between the output shaft and the fixed housing with a linear potentiometer within the output shaft.

12. The method of applying a predetermined longitudinal force according to claim 10 wherein the set voltage is 16 volts which represents a longitudinal force of about 1,000 lbs.

13. The method of applying a predetermined longitudinal force according to claim 10 wherein the set voltage is 24 volts which represents a longitudinal force of about 1,500 lbs.

* * * * *